United States Patent
Ueda et al.

(10) Patent No.: US 6,626,155 B1
(45) Date of Patent: Sep. 30, 2003

(54) FUEL PUMP, FUEL TANK ARRANGEMENT FOR ENGINE

(75) Inventors: Hideaki Ueda, Iwata (JP); Masaki Takegami, Iwata (JP); Kimiaki Nakamura, Iwata (JP); Tadashi Sakurai, Iwata (JP); Teiji Umeno, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 08/373,528

(22) Filed: Jan. 17, 1995

Related U.S. Application Data

(63) Continuation of application No. 07/938,418, filed on Aug. 31, 1992, now abandoned.

(30) Foreign Application Priority Data

Oct. 7, 1991 (JP) ............................................. 3-289332

(51) Int. Cl.[7] ............................................. F02M 37/04
(52) U.S. Cl. .................... 123/509; 123/514; 417/360
(58) Field of Search ................................ 123/509, 510, 123/514; 137/565, 590, 592; 417/360, 364, 423.3

(56) References Cited

U.S. PATENT DOCUMENTS

| | | | | |
|---|---|---|---|---|
| 3,802,804 A | * | 4/1974 | Zimmerson | ............. 417/360 |
| 3,910,464 A | * | 10/1975 | Schlanzky | ............. 137/565 |
| 3,982,856 A | * | 9/1976 | Hehl | ............. 417/360 |
| 3,993,416 A | * | 11/1976 | Kato | ............. 417/360 |
| 4,651,701 A | * | 3/1987 | Weaver | ............. 123/509 |
| 4,750,513 A | * | 6/1988 | Griffin | ............. 417/360 |
| 4,790,185 A | * | 12/1988 | Fedelem | ............. 137/565 |
| 4,871,041 A | | 10/1989 | Saito et al. | |
| 5,080,077 A | * | 1/1992 | Sawert | ............. 123/509 |
| 5,181,839 A | * | 1/1993 | Tuckey | ............. 417/423.3 |
| 5,218,942 A | * | 6/1993 | Coha | ............. 123/509 |

FOREIGN PATENT DOCUMENTS

| | | | |
|---|---|---|---|
| EP | A-0203244 | 12/1986 | |
| JP | 0015756 | * 1/1983 | ............. 123/509 |
| JP | 61104289 | 7/1986 | |
| JP | 63 29676 | 1/1988 | |
| JP | 63177432 | 7/1988 | |
| JP | A-2028075 | 1/1990 | |
| JP | 0245466 | * 10/1990 | ............. 417/360 |

* cited by examiner

*Primary Examiner*—Carl S. Miller
(74) *Attorney, Agent, or Firm*—Ernest A. Beutler

(57) ABSTRACT

A motorcycle having an improved fuel tank arrangement with an opening in an upper side wall of the fuel tank that is closed by a combined fuel pump, closure plate and return port arrangement. The fuel is supplied to a fuel injection system through an arrangement including a filter and pressure regulator with the filter pressure regulator and opening all being positioned on the same side of the motorcycle and at relatively the same vertical height. The assembly may be removed from the opening without draining fuel due to its high placement in the opening.

22 Claims, 3 Drawing Sheets

FUEL PUMP, FUEL TANK ARRANGEMENT FOR ENGINE

This application is a continuation of application Ser. No. 07/938,418, filed Aug. 31, 1992 now abandoned.

BACKGROUND OF THE INVENTION

This invention relates to a fuel pump, fuel tank arrangement for an internal combustion engine and more particularly an improved arrangement of fuel pump and fuel tank and fuel supply system for an engine.

In many applications for internal combustion engines, fuel is supplied to the engine from a remotely located fuel tank. In addition, fuel may be returned back to the fuel tank for a variety of reasons, such as if there is a pressure regulator in the fuel supply side of the system. Pressure is regulated by returning excess fuel back to the fuel tank. Thus, there are necessitated a number of connections between the fuel tank and the fuel supply system.

The desirability of positioning the fuel pump within the fuel tank is also well known. Such placements permit ease of priming and also provides some silencing for the operation of the fuel pump. If the fuel line connections for the return line and the opening through which the fuel pump is inserted in the fuel tank are positioned at a low level in the fuel tank, this means that the fuel tank must be drained before the elements can be serviced. This is clearly a disadvantage.

Also, the use of plurality of separate connections to a fuel tank gives rise to the increased possibility of leakage and also more complex fuel tank constructions.

It is, therefore, a principal object of this invention to provide an improved fuel pump return, line system for a fuel tank for an engine wherein the fuel pump may be removed and serviced without necessitating draining of the fuel from the fuel tank.

It is a further object of this invention to provide an improved fuel pump return line arrangement wherein the fuel pump and return line are all formed in a common assembly which closes a single opening in the upper portion of the fuel tank so as to minimize the number of connections and also to facilitate servicing without draining the fuel tank.

It has been proposed in automotive applications to provide a fuel pump that is inserted through a top wall of the fuel tank so as to permit removal of the fuel pump without draining the fuel in the fuel tank. Such top wall mounting arrangements, however, have some disadvantages, particularly with certain types of motor vehicles such as a motorcycle.

It is, therefore, a still further object of this invention to provide an improved fuel tank, fuel pump arrangement wherein the fuel pump may be inserted into the fuel tank through an opening in the fuel tank without necessitating draining of the fuel tank and also without having the fuel pump pass through an opening in a top wall of the fuel tank.

As noted above, there are certain problems in conjunction with the fuel tank and fuel system component layouts particular to certain types of motor vehicles. For example, motorcycles are extremely small and compact and frequently the fuel tank is positioned in close proximity to and above the engine. However, if a pressure system is employed such as that using a fuel injection system and pressure regulation, the height differences of the various components can give rise to problems in adequate pressure control and component placement. In addition, it is desirable to permit ease of servicing of the components for the fuel tank and the fuel tank mounting of a motorcycle, as noted above, is quite different from that in an automobile. Frequently the fuel tank is positioned directly in front of the rider's seat and above the engine and thus can give rise to problems since the fill neck is in the top of the fuel tank and may cover substantially all of the exposed upper portion of the fuel tank.

It is, therefore, a still further object of this invention to provide an improved fuel pump, fuel tank arrangement particularly adapted for use in a motorcycle.

SUMMARY OF THE INVENTION

A first feature of the invention is adapted to be embodied in a fuel tank, fuel pump arrangement for supplying fuel to an internal combustion engine. The arrangement includes a fuel tank for containing fuel and which has upper wall area that is disposed above the area wetted by the fuel when the fuel tank is at least less than half full. An opening is formed in the upper wall area and a combined fuel pump, fuel return assembly closes this opening. This assembly comprises a mounting plate that is adapted to be affixed to the upper wall area, a fuel pump for pumping fuel attached to the plate and a return fitting for receiving an external conduit for returning fuel to the fuel tank from the engine fuel system.

Another feature of the invention is also adapted to be embodied in a fuel tank, fuel pump arrangement for supplying fuel to an internal combustion engine. In accordance with this feature of the invention, the arrangement includes a fuel tank for containing fuel and having at least one side wall with an upper wall area disposed above the area wetted by the fuel in the tank when the tank is at least less than half full. An opening is formed in this upper wall area and a fuel pump is affixed into this opening for pumping fuel and for closing the opening.

A further feature of this invention is adapted to be embodied in a motorcycle having a frame assembly which dirigibly supports a front wheel. A rear wheel is suspended from the frame assembly and an engine carried by the frame assembly drives the rear wheel. A fuel tank is provided for supplying fuel to the engine and is supported by the frame assembly. The fuel tank has a portion that extends above the frame assembly and an opening is formed in this upper fuel tank portion. A combined fuel pump closure assembly closes the opening and pumps fuel from the fuel tank to the engine.

DETAILED DESCRIPTION OF THE PREFERRED EMBODIMENT OF THE INVENTION

Figure 1:
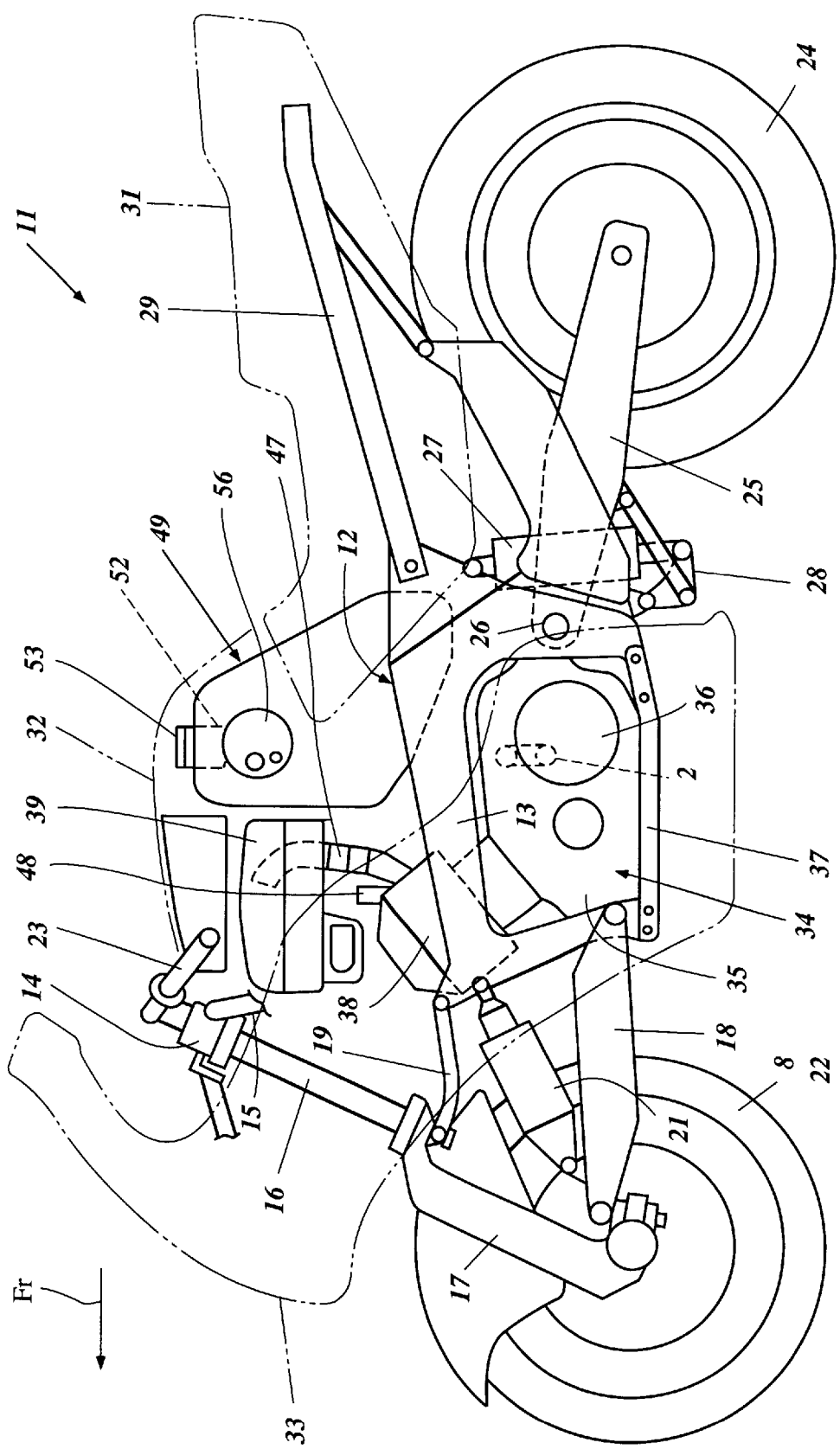
FIG. 1 is a side elevational view of a motorcycle having a fuel tank and fuel feeding arrangement constructed in accordance with an embodiment of the invention.

Referring now in detail to the drawings and initially primarily to FIG. 1, a motorcycle constructed in accordance with an embodiment of the invention is identified generally by the reference numeral 11. The motorcycle 11 is comprised of a frame assembly, indicated generally the reference numeral 12, which is comprised of a pair of generally inverted U-shaped side frame members 13 that are affixed to each other in a well known manner.

A head pipe 14 is carried by the frame assembly 12 by suitable members, including a tubular member 15. The head pipe 14 journals a front wheel suspension unit 16 for steering about a generally vertically extending axis and for vertical suspension movement. This suspension includes a front wheel carrier 17 which is supported for suspension movement relative to the frame assembly 13 by lower and upper leading arms 18 and 19, respectively. A suspension unit 21 comprised a spring and shock absorber is loaded in a suitable manner between the lower arm 18 and the frame assembly 12 for cushioning the suspension movement of a front wheel 22 journaled by the carrier 17. A handlebar assembly 23 is affixed to the upper end of the suspension unit 16 for steering of the front wheel 22 in a well known manner.

A rear wheel 24 is rotatably journaled at the trailing end of a trailing arm 25 that is pivotally connected to the frame assembly 12 by means of a pivot pin 26. A suspension unit 27 is loaded by means of a linkage system 28 and is connected to the frame 12 for cushioning the movement of the rear wheel 24 relative to the frame assembly 12.

The frame assembly 12 further includes a seat rail 29 upon which a rear seat, shown in phantom and identified by the reference numeral 31 is supported. The seat 31 is adapted to accommodate a rider and passenger seated in straddle fashion.

The motorcycle 11 further includes a main body assembly 32, which is shown in phantom, and a cowling 33 which carries a windshield, also shown in phantom.

The motorcycle 11 is powered by a power unit, indicated generally by the reference numeral 34 which, as is typical with motorcycle practice, includes an internal combustion engine having a combined crankcase and transmission assembly 35 which drives an output element 36 which, in turn, drives the rear wheel 24 in a suitable manner. The power unit 34 is mounted in any suitable manner in the frame assembly 12 and detachable side frame members 37 are provided so as to facilitate servicing and removal of the power unit 34.

In the illustrated embodiment, the engine of the power unit 34 is an inline four cylinder engine having a cylinder block 38 which defines four transversely aligned cylinders which are inclined slightly forwardly of the vertical.

Figure 2:
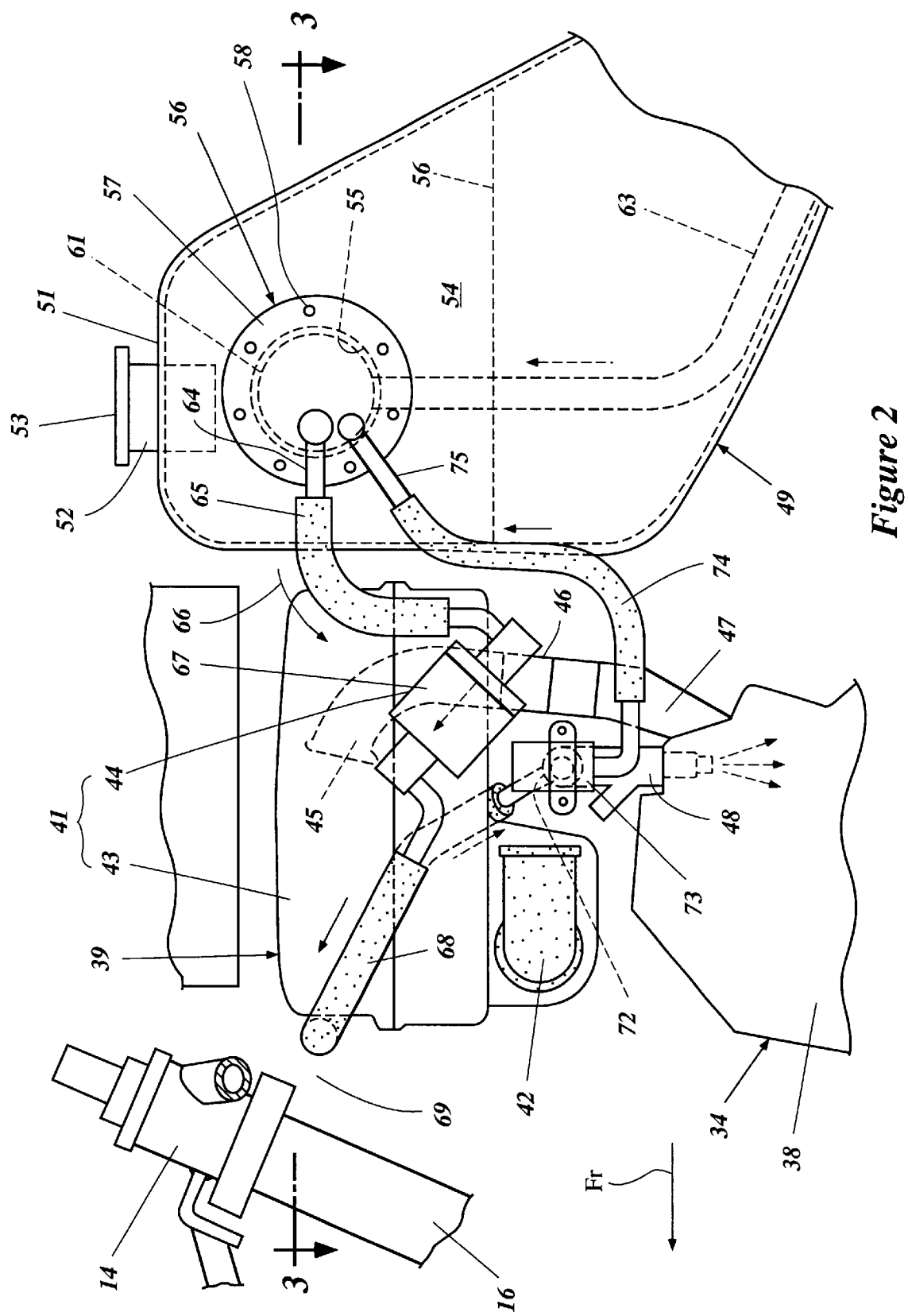
FIG. 2 is an enlarged side elevational view of a portion of the motorcycle showing in more detail the fuel system.
Figure 3:
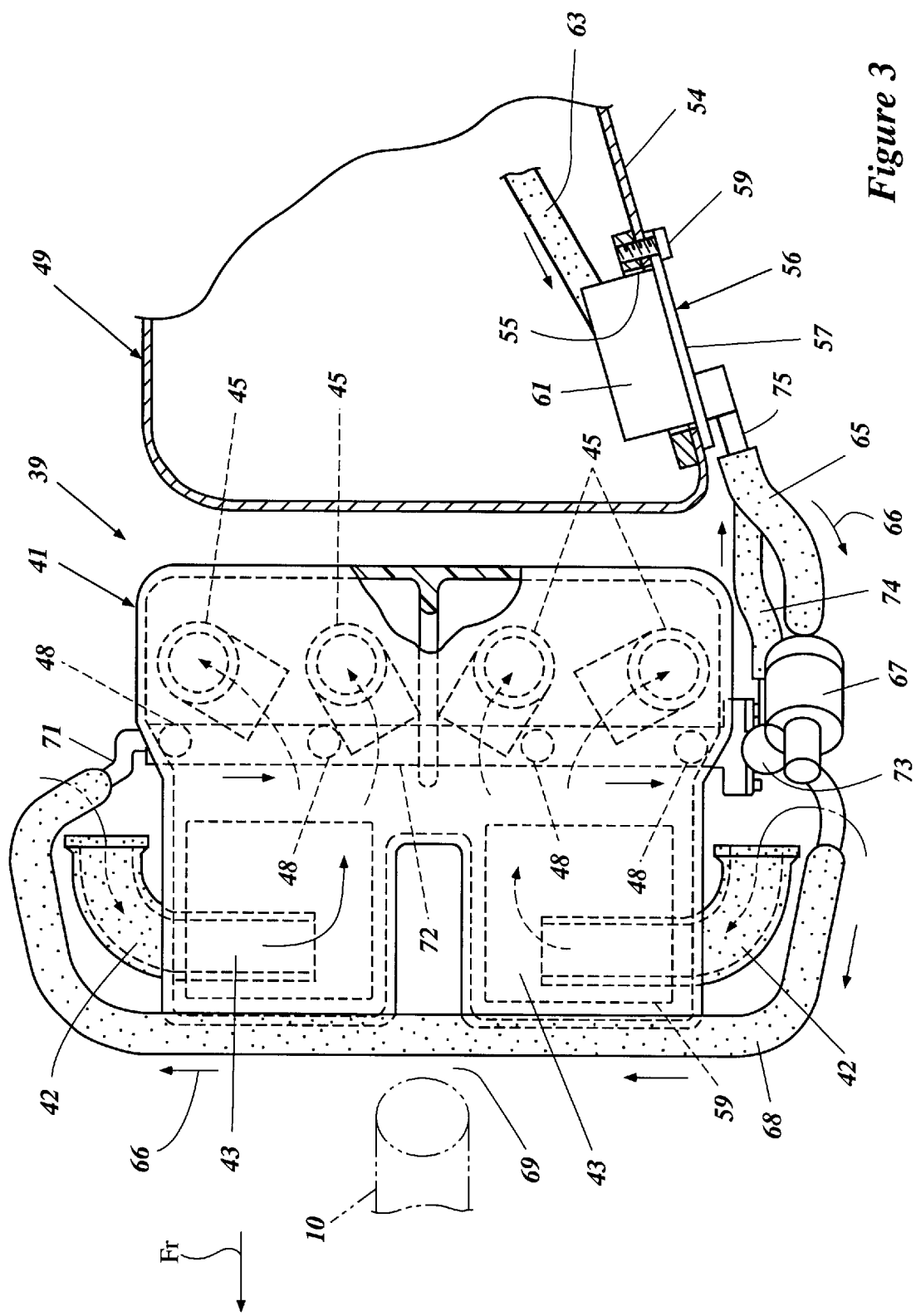
FIG. 3 is a top plan view of the area shown in FIG. 1 and is taken along the line 3—3 of FIG. 2, with portions being shown in section and other portions broken away.

An air charge is supplied to the cylinders of the cylinder bank 34 from an air intake system shown in most detail in FIGS. 2 and 3. This air intake system is indicated generally by the reference numeral 39 and includes an air inlet box 41 having a pair of side air inlet pipes 42 which face rearwardly and draw atmospheric air into an internal chamber of the air inlet box 41. The air inlet box 41 may be formed from a molded fiberglass reinforced resin or the like and has upper and lower parts 43 and 44, respectively which are secured to each other and which define a generally horizontally extending area in which an air cleaner element, not shown, is positioned. The air enters the lower portion of the box 41 through the inlets 42 and flows upwardly through the filter element. A plurality of outlet pipes 45 extend into this upper area and receive the filtered air and then pass down through the lower box 44 and exit as at 46 for connection to the individual intake manifold runners 47 serving the individual cylinders of the cylinder block 38.

In the illustrated embodiment, the power unit 34 is supplied with direct fuel injection by either fuel injectors or fuel/air injectors 48 that are mounted in the cylinder head of the engine in a well known manner and which spray directly into the combustion chambers of the engine.

Fuel is supplied to the fuel/air injectors 48 by a fuel delivery system constructed in accordance with an embodiment of the invention and which includes a fuel tank 49 which is mounted in the frame assembly 12 in a suitable manner and which has an upwardly extending portion terminating in a top wall 51 in which a fill neck 52 is provided. A removable fuel filler cap 53 is mounted on the fuel neck 52 and is accessible through the body portion 32 so that fuel may be added to the fuel tank 49.

In accordance with an important feature of the invention, the fuel tank 49 has a side wall 54 which is formed with an opening 55 near the top wall 51 and above the area of the fuel tank wetted when the fuel tank is at least half filled, as shown by the fuel line 56 in FIG. 2. A combined fuel pump, closure, fuel return assembly, indicated generally by the reference numeral 56, includes a plate portion 57 having a plurality of openings 58 that pass threaded fasteners 59 so as to secure the assembly 56 to the side wall 54 of the fuel tank and also so as to provide a closure for the opening 55.

An electrically driven fuel pump 61 is mounted on the inner surface of the plate 57 and extends through the opening 55. A sealing gasket 62 is interposed between the fuel pump 61 and the opening 55 for sealing purposes. A fuel line 63 extends from the suction side of the fuel pump 61 and depends into the lower portion of the fuel tank 49. A strainer (not shown) may be connected to the end of the fuel line 63 to strain coarse articles from the fuel drawn by the pump 61. When the assembly 56 is removed, the fuel line 63 may easily be drawn out of the fuel tank.

The fuel pump 61 has an outlet fitting 64 that is formed on the outer side of the plate 57 and to which a flexible hose 65 is affixed in a suitable manner. Fuel flows from the line 65 in the direction shown by the arrow 66 to an external fuel filter 67 positioned on the same side of the motorcycle as the fuel tank side wall 54. A further flexible conduit 68 extends from the outlet of the fuel filter 67 and passes across a void area 69 formed at the front of the air box 41 and to the rear of the head pipe 14. This flexible conduit 68 then enters a fuel inlet fitting 71 formed at one end of a fuel rail 72 positioned on the opposite side of the fuel tank 49 from the side wall 54. This fuel rail 71 is connected to the fuel injectors 48 for delivering fuel to them in a well known manner.

At the opposite side of the fuel rail 72 from the inlet fitting 71 and on the same side as the fuel filter 67 and the assembly 56, there is a provided a pressure regulator 73. The pressure regulator 73 regulates the fuel pressure to a desired fuel pressure, which fuel pressure may be related to the air pressure supplied to the injectors 48 if they are fuel/air injectors. This pressure regulation is accomplished by dumping excess fuel back through a flexible conduit 74 to a return fitting 75 which also passes through the plate 57 and which may return the fuel back to the inlet side of the pump 61.

It should be noted that the fuel pump 61, filter 67 and regulator 73 are all at substantially the same height and hence there will not be any significant pressure differences caused by different mounting heights. In addition, all of these components are located on the same side of the motorcycle so as to facilitate servicing and also so as to maintain a compact assembly and minimum length of conduit. Also, the location and positioning permits the assembly 56 to be removed for servicing without necessitating draining of the fuel from the tank 49.

It should be readily apparent that the foregoing description is only that of a preferred embodiment of the invention and that various changes and modifications may be made without departing from the spirit and scope of the invention, as defined by the appended claims.

What is claimed is:

1. An internal combustion engine and fuel pump arrangement for supplying fuel to said internal combustion engine comprising a fuel tank for containing fuel, said fuel tank having a vertically extending upper wall area, an opening in said upper wall area disposed above the area wetted by fuel when said fuel tank is at least one half full for retaining a substantial amount of fuel in said fuel tank if said opening is not closed, and an combined fuel pump, fuel return assembly for closing said opening, said assembly comprising a mounting plate adapted to be affixed to said upper wall, a fuel pump for pumping fuel attached to said plate and having a pick up adapted to extend to a lower portion of said fuel tank when installed, and a return fitting for receiving an external conduit, said external conduit receiving fuel from a pressure regulator positioned externally of said fuel tank and to which fuel is delivered from said fuel pump for returning fuel to said fuel tank to regulate fuel pressure.

2. An internal combustion engine and fuel pump arrangement as set forth in claim 1 wherein the pressure regulator is positioned in proximity to the opening.

3. An internal combustion engine and fuel pump arrangement as set forth in claim 2 wherein the engine is supplied with fuel by at least one fuel injector and a fuel rail for supplying fuel to the fuel injector, the pressure regulator mounted at a side of the fuel rail adjacent the opening.

4. An internal combustion engine and fuel pump arrangement as set forth in claim 3 wherein the opening is positioned in a side wall of the fuel tank.

5. An internal combustion engine and fuel pump arrangement as set forth in claim 4 further including a fuel filter positioned between the fuel pump and the fuel rail and disposed on the same side as the opening and the pressure regulator.

6. An internal combustion engine and fuel pump arrangement for supplying fuel to said internal combustion engine comprising a fuel tank for containing fuel, said fuel tank having an outer peripheral side wall having at least a portion extending vertically, an opening in said outer peripheral side wall disposed above the area wetted by the fuel when the fuel tank is at least one half full so that a substantial amount of fuel will remain in said fuel tank if said opening is not closed, and a fuel pump mounted in said opening and closing said opening for pumping fuel to the engine, said fuel pump having a pick up extending to the lower portion of said fuel tank when installed.

7. An internal combustion engine and fuel pump arrangement as set forth in claim 6 wherein system for supplying fuel to the engine comprises a pressure regulator for regulating pressure delivered to the engine by returning fuel to the fuel tank through a return fitting formed as an assembly with the fuel pump and said pressure regulator is positioned in proximity to the opening.

8. An internal combustion engine and fuel pump arrangement as set forth in claim 6 wherein the pressure regulator is positioned forwardly of the opening.

9. An internal combustion engine and fuel pump arrangement as set forth in claim 8 wherein the engine is supplied with fuel by at least one fuel injector and a fuel rail for supplying fuel to the fuel injector, the pressure regulator mounted at a side of the fuel rail adjacent the opening.

10. An internal combustion engine and fuel pump arrangement as set forth in claim 9 further including a fuel filter positioned between the fuel pump and the fuel rail and disposed on the same side as the opening and the pressure regulator.

11. A fuel tank, fuel pump arrangement in combination with a motorcycle having a frame assembly, a front wheel dirigibly supported by said frame assembly, a rear wheel suspended by said frame assembly, an engine carried by said frame assembly for driving said rear wheel, said fuel tank, fuel pump arrangement for supplying fuel to said engine comprising a fuel tank for containing fuel, said fuel tank having an outer peripheral side wall having at least a portion extending vertically, an opening in said upper side wall portion disposed above the area wetted by the fuel when the fuel tank is at least less than one half full so that a substantial amount of fuel will remain in said fuel tank if said opening is not closed, and a fuel pump mounted in said opening and closing said opening for pumping fuel to the engine, said fuel tank being supported by said frame assembly with the opening extending above said frame assembly.

12. A motorcycle as set forth in claim 11 wherein the system for supplying fuel to the engine comprises a pressure regulator for regulating pressure delivered to the engine by returning fuel to the fuel tank through a return fitting formed as a unit with the combined fuel pump, closure.

13. A motorcycle as set forth in claim 12 wherein the pressure regulator in positioned in proximity to the opening.

14. A motorcycle as set forth in claim 13 wherein the pressure regulator is positioned forwardly in the motorcycle from the opening.

15. A motorcycle as set forth in claim 14 wherein the engine is supplied with fuel by at least one fuel injector and a fuel rail for supplying fuel to the fuel injector, the pressure regulator mounted at a side of the fuel rail adjacent the opening.

16. A motorcycle as set forth in claim 15 further including a fuel filter positioned between the fuel pump and the fuel rail and disposed on the same side as the opening and the pressure regulator.

17. An internal combustion engine and fuel pump arrangement as set forth in claim 1 wherein the fuel tank, fuel pump assembly and engine form a portion of a motorcycle and wherein the fuel tank is mounted on a frame of the motorcycle.

18. An internal combustion engine and fuel pump arrangement as set forth in claim 17 wherein the pressure regulator in positioned in proximity to the opening.

19. An internal combustion engine and fuel pump arrangement as set forth in claim 18 wherein the pressure regulator is positioned forwardly from the opening.

20. An internal combustion engine and fuel pump arrangement as set forth in claim 17 wherein the engine is supplied with fuel by at least one fuel injector and a fuel rail for supplying fuel to the fuel injector, the pressure regulator mounted at a side of the fuel rail adjacent the opening.

21. An internal combustion engine and fuel pump arrangement as set forth in claim 20 wherein the opening is positioned in a side wall of the fuel tank.

22. An internal combustion engine and fuel pump arrangement as set forth in claim 21 further including a fuel filter positioned between the fuel pump and the fuel rail and disposed on the same side as the opening and the pressure regulator.

* * * * *